Dec. 28, 1954  R. T. MORRISSEY ET AL  2,698,041
HOLLOW FLUID-CONTAINING ARTICLE COMPRISING
BROMINATED RUBBERY INTERPOLYMER
Filed June 30, 1951

Inventors
Richard T. Morrissey
Henry J. Weiss
By Robert W. Furlong
Atty.

United States Patent Office 2,698,041
Patented Dec. 28, 1954

2,698,041

HOLLOW FLUID-CONTAINING ARTICLE COMPRISING BROMINATED RUBBERY INTERPOLYMER

Richard T. Morrissey and Henry J. Weiss, Cuyahoga Falls, Ohio, assignors to The B. F. Goodrich Company, New York, N. Y., a corporation of New York Application June 30, 1951, Serial No. 234,544

7 Claims. (Cl. 152—349)

This invention relates to hollow, fluid-retaining articles and more particularly to such articles which are adapted to be used in conjunction with a pneumatic tire.

It is an object of this invention to provide a means for retaining air or other fluid in a pneumatic tire.

It is also an object to provide a heat-resistant member for pressing a tire outwardly against a mold during vulcanization.

It is a further object to provide an improved liner for pneumatic tires.

It is an object to provide an improved inner tube to be used with a pneumatic tire.

Other objects will be apparent from the description and claims which follow.

It has been discovered that such articles as inner tubes, inner liners for "tubeless" tires, water bags and bladders for curing tires, and other like hollow, fluid-retaining articles made of bromine-containing derivatives of isoolefin-polyolefin interpolymers are greatly superior to those made of unbrominated isoolefin-polyolefin interpolymers or other rubbery compositions. Blends of bromine-containing derivatives of isoolefin-polyolefin interpolymers with crude rubber or any of the well-known synthetic rubbers have also been found particularly suitable for certain of these applications. Such interpolymers have been prepared by the introduction of bromine atoms into the polymer structure of the isoolefin-polyolefin interpolymer.

The isoolefin-polyolefin interpolymer preferably used in preparing the brominated derivative comprises a major proportion of an isoolefin such as isobutylene and a minor proportion of one or more polyolefins (i. e. diolefins, triolefins, or other olefins containing more than one double bond), which interpolymers are characterized by high molecular weight, low unsaturation, and low reactivity with sulfur to give an elastic product. These interpolymers are described in United States Patents Nos. 2,322,073; 2,356,128; 2,356,129; 2,356,130; 2,373,706; 2,384,975 and 2,418,912. The most common interpolymers of this type are copolymers of a major proportion of isobutylene and a minor proportion of isoprene which are known as "Butyl" or GR–I–50, GR–I–15, GR–I–17, and GR–I–18. The isoolefin-polyolefin interpolymers used in preparing brominated derivatives are the solid plastic rubbery interpolymers described in the above-listed patents. Examples are the interpolymers of a major proportion, desirably from 70 to 99% by weight, of an isoolefin containing from 4 to 8 carbon atoms such as isobutylene, 3-methyl butene-1, 4-methyl pentene-1, 2-ethyl butene-1, 4-ethyl pentene-1 or the like, or a mixture of such isoolefins, with a minor proportion, desirably from 1 to 30% by weight, of a polyolefin generally containing from 4 to 18 carbon atoms, or two, three, or more such polyolefins, including the following:

(1) acyclic or open-chain conjugated diolefins such as butadiene-1,3, isoprene, 2,4-dimethyl butadiene-1,3, piperylene, 3-methyl pentadiene-1,3, hexadiene-2,4, 2-neopentyl-butadiene-1,3 and the like;

(2) acyclic non-conjugated diolefins such as dimethallyl and its homologs containing 2 to 6 carbon atoms interposed between two isopropenyl radicals, 2-methyl hexadiene-1,5, 2-methyl pentadiene-1,4, 2-methyl heptadiene-1,6, 2-methyl heptadiene-1,4 and other tertiary non-conjugated diolefins having one double bond in the terminal position attached to a tertiary carbon atom;

(3) alicyclic diolefins, both conjugated and non-conjugated, such as cyclopentadiene, cyclohexadiene, 1-vinyl cyclohexene-3, 1-vinyl cyclohexene-1, 1-vinyl cyclopentene-1, 1-vinyl cyclobutene-2, dicyclopentadiene, and the like, as well as monocyclic diolefinic terpenes such as dipentene, terpinenes, terpinolene, phellandrines, sylvestrene and the like;

(4) acyclic triolefins such as 2,6-dimethyl-4-methyleneheptadiene-2,5, 2-methyl hexadiene-1,3,5 and other conjugated triolefins, as well as myrcene, ocimene, alloocimene and the like;

(5) alicyclic triolefins such as fulvene, 6,6-dimethyl fulvene, 6,6-methyl ethyl fulvene, 6-ethyl fulvene, 6,6-diphenyl fulvene, 6-phenyl fulvene and other fulvenes of the formula

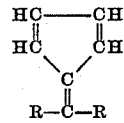

wherein each R is hydrogen, alkyl, cycloalkyl or aryl; as well as other alicyclic triolefins such as 1,3,3-trimethyl-6-vinyl-cyclohexadiene-2,4, cycloheptatriene, etc.; and (6) higher polyolefins such as 6,6-vinyl methyl fulvene (a tetraolefin) and 6,6-diisopropenyl fulvene (a pentaolefin).

The preferred solid, plastic, rubbery interpolymers are generally prepared by low temperature (from 0° C. to −165° C.) interpolymerization using an appropriate catalyst such as an active metal halide or Friedel-Crafts type catalyst (aluminum chloride or boron trifluoride) dissolved in a low freezing solvent such as methyl or ethyl chloride. These interpolymers generally have an average molecular weight above 15,000, iodine numbers of from 0.5 to 50, and they are reactive with sulfur to form elastic products.

Isoolefin-polyolefin interpolymers containing other additional monomers such as styrene, chlorostyrenes, acrylyl chloride, methallyl chloride, and other monoolefinic monomers may also be used instead of a true copolymer of isoolefin and polyolefin alone. An interpolymer produced from a monomer system comprising 50% isobutylene, 30% styrene and 20% isoprene may be used.

The bromination of these interpolymers may be carried out by any suitable process including (1) passing gaseous bromine over finely-divided solid isoolefin-polyolefin interpolymer, (2) adding a solid brominating agent such as N-bromosuccinimide to the interpolymer on a mixing mill, or (3) preparing a solution, dispersion or cement of the interpolymer in a suitable liquid organic solvent and adding the brominating agent either as such or in solution to the interpolymer solution to form the brominated interpolymer in solution or dispersion in the solvent, which final solution is admixed with a non-solvent for the brominated derivative to precipitate the latter.

The bromination occurs quite rapidly and it is believed to consist essentially in addition of bromine to the olefinic double bonds of the interpolymer although some substitution of bromine atoms for hydrogen atoms probably takes place. The amount of bromine which combines with the interpolymer depends upon the concentration of brominating agent, the method of brominating, and the time of reaction.

The brominated interpolymers may contain from 0.5 to as high as 50% by weight of combined bromine depending on the degree of unsaturation, which in turn depends upon the proportion of polyolefin, in the interpolymer used. Generally, it is desirable to have the amount of combined bromine less than that which would be present if all olefinic double bonds (>C=C< units) were completely brominated to give

units. Preferably, in the rubbery isoolefin-polyolefin interpolymers used in this invention, the percentage of combined bromine is from 20 to 80% of the amount which would be present if all olefinic double bonds were completely brominated. Generally, the preferred amount of combined bromine is from 1.5 to 6% by weight in interpolymers containing from 95 to 98% isoolefin and from 2 to 5% diolefin.

The inner tubes, tire-vulcanizing bags (water bags), and inner liners for the so-called tubeless tires of this invention have unique properties, some of these properties being:

1. They have low fluid-permeability and especially low air-permeability.
2. They are resistant to heat deterioration.
3. They have superior ozone resistance.
4. They have excellent flex properties and good flex-life.
5. They may be vulcanized more rapidly than those made of unbrominated isoolefin-polyolefin interpolymers.

To illustrate, the invention will be exemplified in detail as follows:

Figure 1:
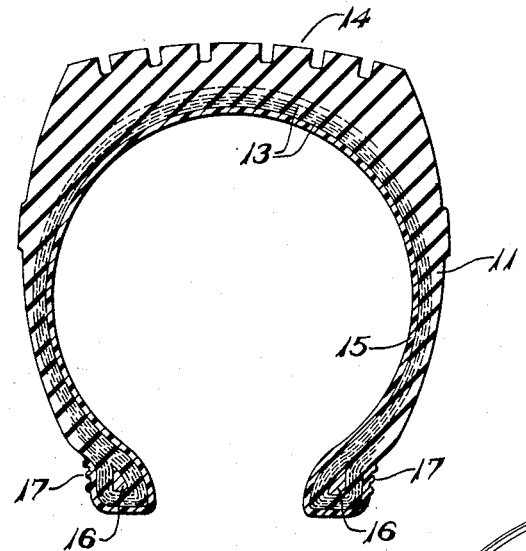
Fig. 1 is a sectional view of a tire having an inner liner embodying the invention.

In Fig. 1 the tire comprises a carcass 11 constructed of natural or butadiene-styrene synthetic rubber impregnated textile cord plies 13, a tread portion 14, an inner liner 15, beads 16, and bead cushions 17.

The rubbery material used in the plies of the carcass may be any suitable rubbery polymer or copolymer, but the material of the inner liner preferably comprises a brominated derivative of this invention which may be prepared according to the following example.

EXAMPLE 1

The rubbery material for the inner liner is prepared by dissolving a high molecular weight, solid, plastic interpolymer of about 97% isobutylene and 3% isoprene in liquid ethyl chloride to form a 20% solution containing 100 parts of copolymer. A solution containing 5 to 16 parts of bromine dissolved in ethyl chloride is added to the interpolymer solution at 0° C. in a closed vessel and the resulting mixture is stirred for five minutes at which point an excess of alcoholic potassium hydroxide is added to neutralize the unreacted bromine. The mixture is stirred for several minutes and an aqueous slurry of finely-divided calcium silicate (2.5% based on the weight of brominated interpolymer), which serves to stabilize the brominated interpolymer, is added and the mixture stirred rapidly. The homogeneous mixture is discharged from the reaction vessel in a fine stream into a closed coagulating tank fitted with a condenser, the tank containing hot water (60° to 70° C.) and a colloidal dispersion of calcium silicate, whereupon the ethyl chloride is flashed off and recovered in the condenser and the brominated interpolymer is obtained as a fine crumb-like coagulum containing intimately dispersed calcium silicate. The coagulum is separated by filtering, washed with clear water, and dried.

The calcium silicate stabilized brominated isobutylene-isoprene interpolymer composition obtained contains from 1.5 to 5.0% combined bromine depending on the original amount of bromine used and from 2.5 to 3.0% by weight of calcium silicate.

The brominated derivative is mixed with crude rubber and compounding ingredients according to the following recipe:

*Inner liner*

|   | Parts |
|---|---|
| Brominated derivative (3% combined bromine) | 70.0 |
| Crude rubber | 30.0 |
| Heptylated diphenyl amine | 1.0 |
| Carbon black | 35.0 |
| Zinc oxide | 5.0 |
| Sulfur | 2.3 |
| Mercapto benzothiazole | 0.7 |
| Di-ortho-tolyl guanidine | 0.5 |
| Total | 144.5 |

The rubbery materials and compounding ingredients are mixed on a mill and the sheets thus obtained are calendered to the desired thickness.

The tire is constructed in the conventional manner. The inner liner 15 is placed on the building drum and then the conventional rubber-frictioned cord fabric plies 13 are laid one on another to form a plied carcass. A conventional rubber tread portion 14 is provided by mixing rubber and other ingredients in the usual manner, extruding the composition into the proper configuration and applying the tread portion 14 about the crown of the carcass 11. The inner liner ply 15 is wrapped about the bead wire 16 and meets the bead cushion 17 as shown in Fig. 1. The assembled tire is vulcanized in a mold at 280° F. for about 30 minutes.

The inner liner and other rubbery components of the carcass and tread vulcanize simultaneously under these time and temperature conditions. The inner liner is tightly adhered to the carcass without any need for special cements or tie gum layers. The inner liner has a very low air permeability, i. e., about 10% of that through a like crude rubber layer, so that the tire may be used without an inner tube if the bead portions are seated on a wheel rim so as to seal against leaks.

The inner liner composition is preferably a blend of from 10 to 40 parts of crude rubber with from 90 to 60 parts of brominated isoolefin-polyolefin interpolymer such as the 70:30 blend of this example. These blends can be vulcanized while blends of brominated isoolefin-polyolefin interpolymer and crude rubber can not be satisfactorily vulcanized. The inner liner also has good flex properties and age-resistance.

The brominated derivative prepared according to Example 1 was used in preparing an inner tube composition by using the following recipe:

EXAMPLE 2

*Inner tube*

|   | Parts |
|---|---|
| Brominated derivatives (3% combined bromine) | 60.0 |
| Crude rubber | 40.0 |
| Carbon black | 21.0 |
| Heptylated diphenyl amine | 0.8 |
| Zinc oxide | 3.6 |
| Cottonseed fatty acid | 3.3 |
| Paraffin oil | 0.2 |
| Pine tar | 2.3 |
| Castor oil | 1.4 |
| Sulfur | 2.1 |
| Mercapto benzothiazone | 0.8 |
| Di-ortho-tolyl guanidine | 0.5 |
| Total | 136.0 |

Figure 2:
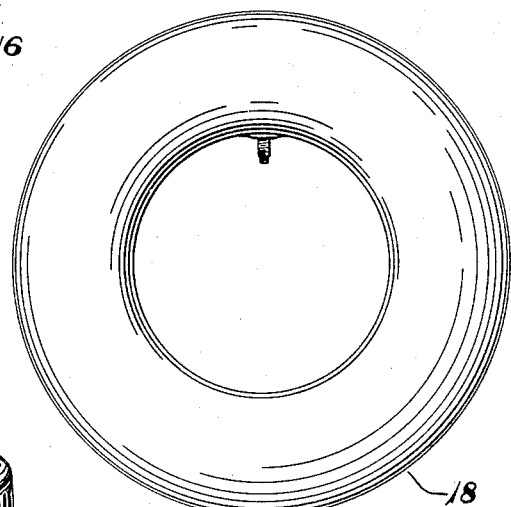
Fig. 2 is an elevation of an inner tube or a tire vulcanizing bag.

These ingredients are mixed on a rubber mill and a conventional inner tube 18 formed by the usual methods, see Fig. 2, and vulcanized by heating at 335° F. for six minutes. The inner tube has very low air permeability, good flex properties and good age-resistance.

Figure 3:
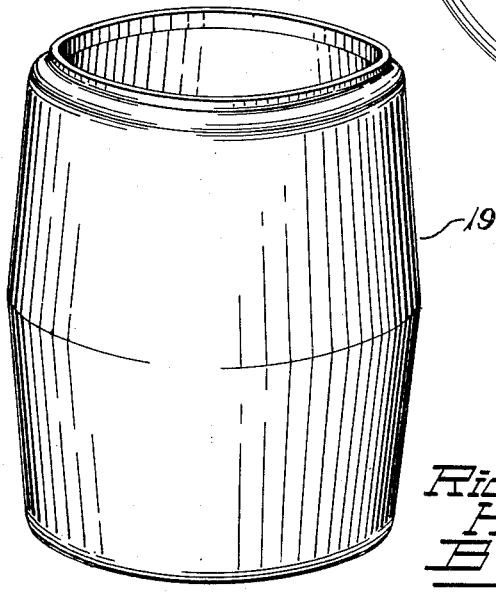
Fig. 3 is a perspective view of a bladder used to form a tire during the molding and vulcanization thereof.

The brominated derivative prepared by the method of Example 1 was also used in preparing a composition suitable for constructing a water bag or a vulcanization bladder such as that shown in Fig. 3.

EXAMPLE 3

*Bladder or water bag*

|   | Parts |
|---|---|
| Brominated derivative | 100.0 |
| Zinc oxide | 15.0 |
| Carbon black | 50.0 |
| Stearic acid | 1.0 |
| Trimethyl-dihydroquinoline | 0.5 |
| 2,2' benzothiazyl disulfide | 2.0 |
| Sulfur | 2.0 |
| Paraffin base oil | 3.0 |
| Total | 173.5 |

These ingredients are mixed on a mill and a bladder 19 molded from the resulting composition. The bladder is vulcanized by heating in a mold at a temperature of 292° F. for sixty minutes.

When this bladder is employed in molding tires in a "Bagomatic Press" it is found the bladder has unusual heat-resistance, good flex-life, high resistance to aging, good ozone resistance, and low fluid-permeability.

Tire curing bags, which are of the same construction as a conventional inner tube except that the wall is thicker, may likewise be made from the composition of Example 3. Such a curing bag or "water bag," when used in conjunction with a conventional tire molding press gives long service because of its unique properties including great resistance to heat deterioration, good flex-life, low fluid permeability, and resistance to aging.

It has been found that brominated isoolefin-polyolefin interpolymer compositions containing no other rubbery ingredient may be used in the water bag or curing bladder; however, blends of these brominated derivatives with crude rubber or synthetic rubbers may be used. Such blends which contain at least 60% brominated derivative, preferably from 60 to 90%, have better tack and flexibility and can be more readily spliced. Surprisingly enough, bags made of these blends or mixtures may readily be vulcanized under approximately the same conditions as bags made of either rubbery ingredient alone. Bags, inner tubes, or liners for tires made with such mixtures are superior to those made of the brominated interpolymer alone in that they are more readily processed on ordinary rubber-working machinery and possess much greater surface tack before vulcanization, enabling them to be butt-spliced, for example, without difficulty.

Although specific examples have been given, it is not intended to limit the invention thereto, rather it is intended to include any use of the brominated interpolymers within the spirit and scope of the appended claims.

We claim:

1. A hollow toroidal fluid-retaining flexible rubbery article characterized by possessing low fluid permeability, resistance to heating deterioration, superior ozone resistance and long flex life, said article being made of a substantial proportion of a vulcanized brominated rubbery interpolymer of a major proportion of an isoolefin containing from 4 to 8 carbon atoms and a minor proportion of a polyolefin containing from 4 to 18 carbon atoms, said brominated interpolymer retaining a portion of its original olefinic unsaturation and containing bromine in an amount of at least 0.5% by weight.

2. An article as defined in claim 1 further characterized in that the vulcanized brominated rubbery interpolymer is a vulcanized brominated rubbery interpolymer of 70 to 99% by weight of isobutylene and 1 to 30% by weight of an aliphatic conjugated diolefin, said brominated interpolymer containing from 1.5 to 6% by weight of combined bromine.

3. An article as defined in claim 1 further characterized in that it is an air-retaining inner tube for a pneumatic tire.

4. An article as defined in claim 1 further characterized in that it is a tire curing bag conformable to the inner surface of a tire casing for forming and pressing said tire casing.

5. An article as defined in claim 1 further characterized in that it is an air-retaining liner for a tubeless tire, said liner being adapted to be adhered to the inner surface of the casing of the tire.

6. An article as defined in claim 1 further characterized in that it is made of a vulcanized mixture of the rubbery brominated interpolymer with crude natural rubber.

7. In a tubeless pneumatic tire comprising a tread member and a hollow open-bellied carcass including a pair of opposing bead members the combination therein of a flexible lining member extending across the inner face of said carcass in adherent contact therewith from bead portion to bead portion, said lining member comprising a vulcanized brominated rubbery interpolymer of 70 to 99% by weight of isobutylene and 1 to 30% by weight of an aliphatic conjugated diolefin, said brominated interpolymer containing a combined bromine content above 0.5% by weight but less than that which corresponds to complete saturation of the olefinic bonds.

References Cited in the file of this patent

UNITED STATES PATENTS

| Number | Name | Date |
|---|---|---|
| 2,305,412 | Frolich et al. | Dec. 15, 1942 |
| 2,403,200 | Weiss et al. | July 2, 1946 |
| 2,564,662 | Baker | Aug. 21, 1951 |
| 2,566,384 | Tilton, Jr. | Sept. 4, 1951 |
| 2,587,428 | Antonson | Feb. 26, 1952 |
| 2,587,470 | Herzegh | Feb. 26, 1952 |
| 2,631,984 | Crawford et al. | Mar. 17, 1953 |

FOREIGN PATENTS

| Number | Country | Date |
|---|---|---|
| 122,731 | Australia | July 22, 1944 |

OTHER REFERENCES

Gallo et al.: Ind. and Eng. Chem., July 1948.